April 24, 1945.  A. J. ANDERSON  2,374,520
COILING MACHINE AND METHOD OF COILING RODS
Filed June 17, 1942  6 Sheets-Sheet 2

April 24, 1945.    A. J. ANDERSON    2,374,520
COILING MACHINE AND METHOD OF COILING RODS
Filed June 17, 1942    6 Sheets-Sheet 6

Inventor
Andrew J. Anderson
By Caswell & Lagaard
Attorneys

Patented Apr. 24, 1945

2,374,520

UNITED STATES PATENT OFFICE 2,374,520

COILING MACHINE AND METHOD OF COILING RODS

Andrew J. Anderson, Minneapolis, Minn.

Application June 17, 1942, Serial No. 447,455

19 Claims. (Cl. 153—64)

My invention relates to coiling machines and to the method of coiling rods and has for an object to provide a coiling machine by means of which open helixes or coils, such as cork screws, may be readily formed on relatively heavy stock.

An object of the invention resides in providing a machine in which the stock to be coiled is attached to a mandrel and the mandrel simultaneously rotated and given forward axial movement to produce the desired helix.

Another object of the invention resides in providing a machine in which the mandrel is held from rotation and the same given reverse axial movement to withdraw the mandrel from the helix.

Another object of the invention resides in providing a coiling machine utilizing a screw connected to the mandrel and a nut cooperating therewith and in providing mechanism by means of which the nut is first held from rotation and the screw and mandrel rotated to procure a helical movement of the mandrel and by means of which the mandrel is subsequently held from rotation and the nut rotated to procure reverse axial movement of the mandrel without rotation thereof.

A feature of the invention resides in the construction of the operating and controlling mechanism for effecting the desired performance of the machine.

An object of the invention resides in the method of coiling rods in which the rod is first formed with a bend and thereafter coiled.

Other objects of the invention reside in the novel combination and arrangement of parts and in the details of construction hereinafter illustrated and/or described.

In the drawings:

Fig. 3 is a side elevational view of the machine shown in Fig. 1.

Fig. 5 is a longitudinal elevational sectional view taken on line 5—5 of Fig. 1 and drawn to the same scale as Fig. 4.

Figure 1:
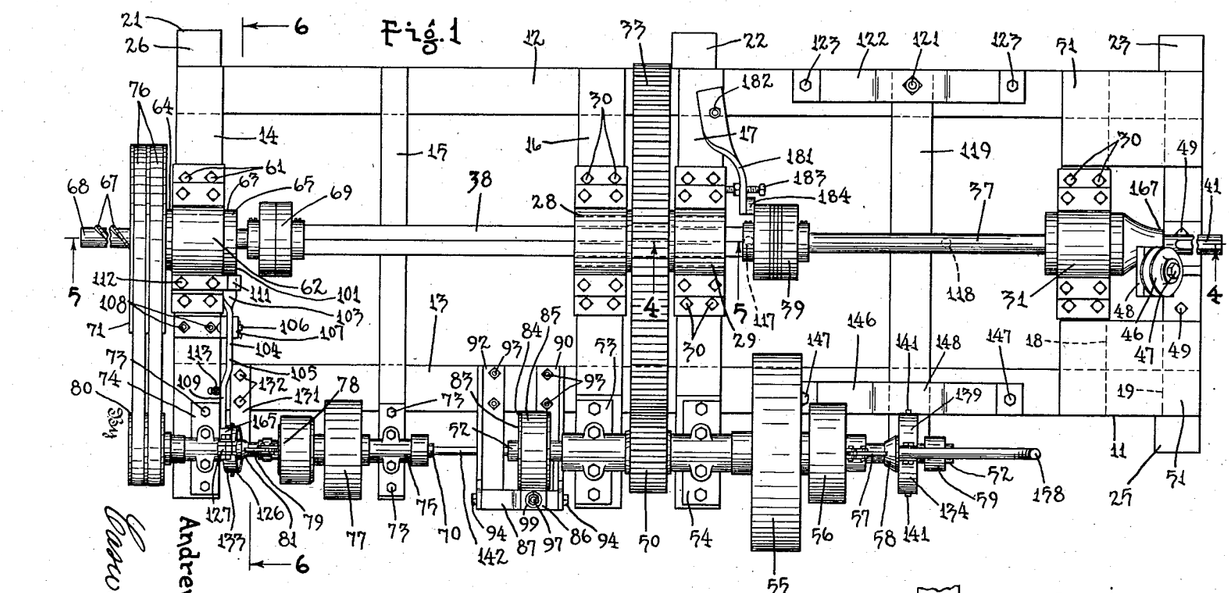
Fig. 1 is a plan view of a coiling machine illustrating an embodiment of my invention.
Figure 2:
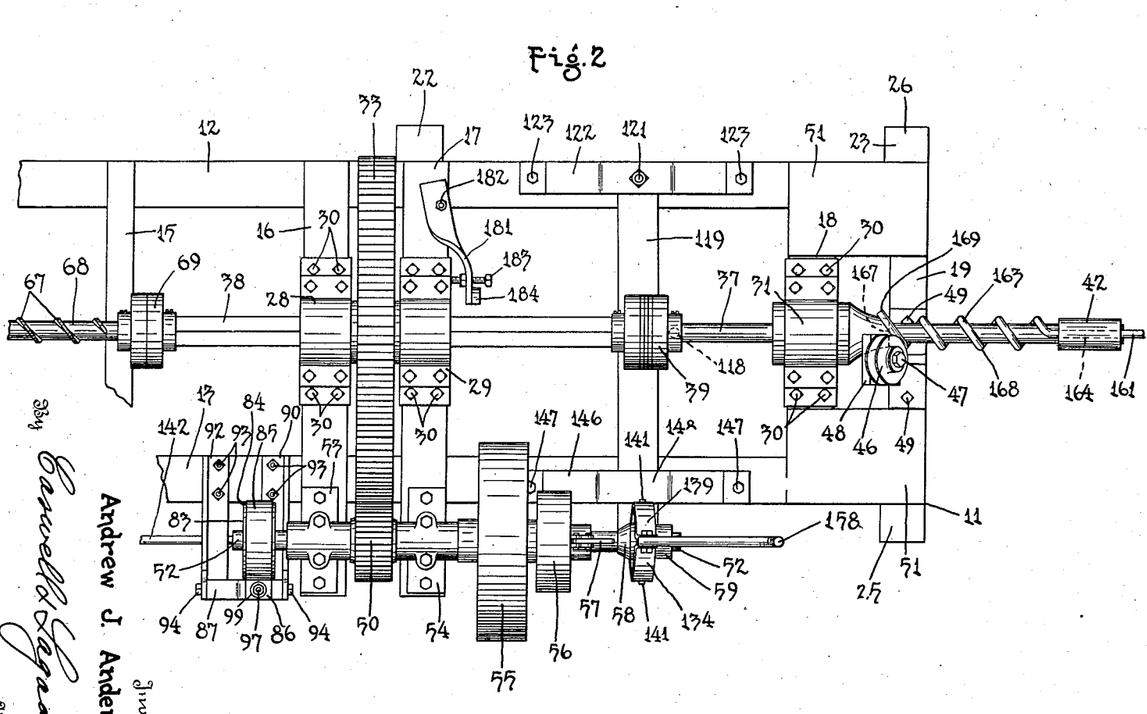
Fig. 2 is a view similar to Fig. 1 of a portion of the machine showing the arrangement of the parts after the formation of a coil.
Figure 6:
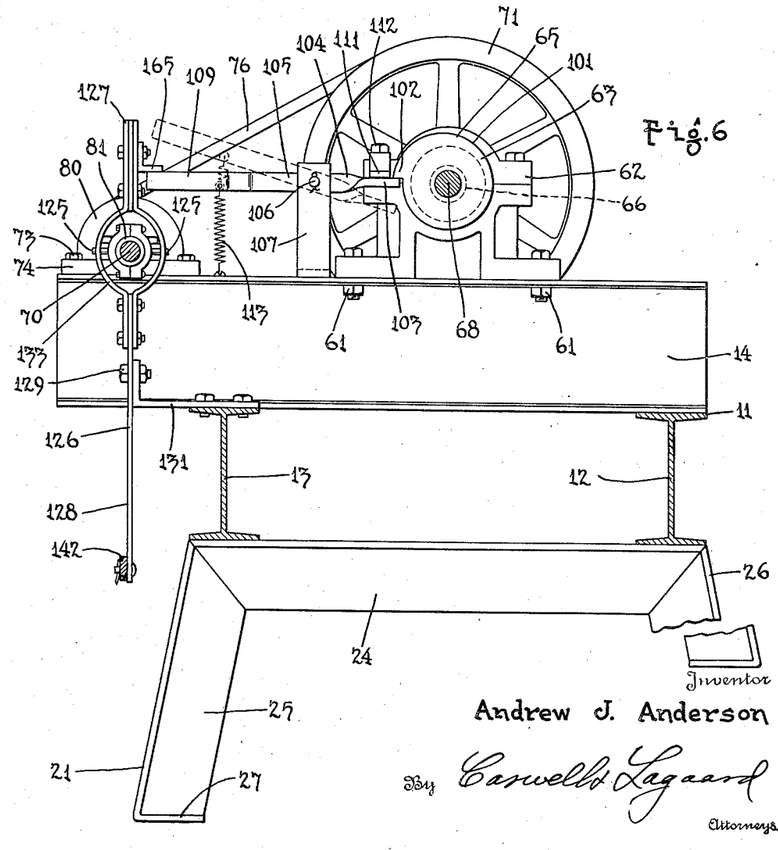
Fig. 6 is a cross-sectional view of the invention taken on line 6—6 of Fig. 1 and drawn to the same scale as Figs. 4 and 5.

My invention comprises a framework 11, best shown in Figs. 1 and 3, which consists of two longitudinal frame members 12 and 13, which may be constructed as I-beams. These frame members are connected together by means of a number of transverse frame members 14, 15, 16, 17, 18 and 19. The frame members 14, 16, 17 and 18 are preferably I-beams, while the frame members 15 and 19 are channel beams. The various frame members of the invention are secured together by bolting, welding or in any other suitable manner which, being well known in the art, have not been shown in the drawings. The frame 11 rests upon three horses 21, 22 and 23, said horses being identical in construction. In Fig. 6, the horse 21 is shown in detail which is constructed from angle stock sheared, bent and welded together at the corners to form a saddle 24 and two legs 25 and 26 connected thereto. The flanges of the legs 25 and 26 are bent inwardly, as indicated at 27, to form feet which rest upon the supporting surface on which the machine stands.

Mounted on the cross frame members 16, 17 and 18 are three bearings 28, 29 and 31 which are secured thereto by means of bolts 30. Rotatable in the bearings 28 and 29 is a sleeve 32, best shown in Fig. 5, which has attached to it intermediate the ends thereof a spur gear 33 by means of which said sleeve may be rotated. The bearings 28 and 29 have linings 34 which rotatably support the sleeve 32 and the gear 33 has a boss 35 which engages the ends of these linings and holds the sleeve 32 from axial movement. The sleeve 32 has a lining 36 in the same which is formed with a square hole 40 adapted to receive a square shaft 38. The corners of said shaft serve as splines acting between the sleeve 32 and shaft 38, whereby the said shaft may be rotated and yet permitted to slide axially within the sleeve 32.

Figure 7:
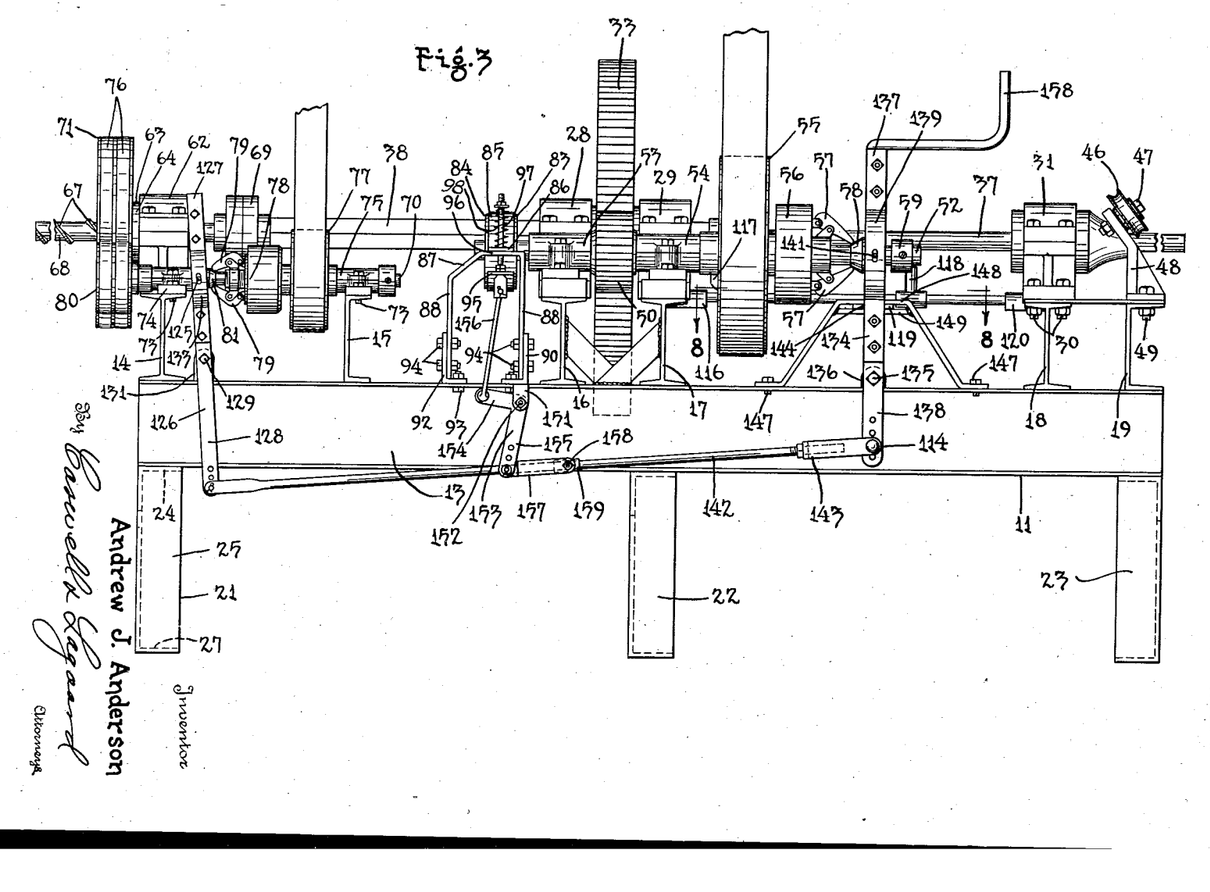
Fig. 7 is a fragmentary end elevational view of the mandrel and stock feeding device of the invention.

In the bearing 31 (Fig. 4) is slidably and rotatably mounted a mandrel 37 which is connected to the end of the shaft 38 by means of a coupling 39. This mandrel is formed at the end of the same with a groove 41 in which the stock to be coiled is inserted and by means of which the stock is rotated with the mandrel in the formation of the coil or helix. For the purpose of securing the rod in the groove 41, a split clamp sleeve 42 is employed which is shown in detail in Fig. 7, which has a bore 43 of a diameter sufficient to permit of sliding of the said sleeve over the protruding end of the mandrel 37. The said sleeve has a slot 44 extending along the edge thereof which slot communicates with the bore 43. Secured to the sleeve 42 is a key 45 which extends into the slot 41 in the mandrel 37 and serves to hold the stock in place in a manner to be presently more fully described.

The stock is fed onto the mandrel 37 by means of a sheave 46 which is rotatably mounted on a stud 47 secured to a bracket 48. Bracket 48 is attached to the channel frame member 19 by means of bolts 49. For preventing longitudinal movement between the bracket 48 and the bearing 31, two plates are provided which overlie the upper flanges of the frame members 18 and 19 and are welded along their edges to the edges of said flanges.

The gear 33 is driven from a countershaft 52 which is journaled in two bearings 53 and 54 secured to the transverse frame members 16 and 17. This shaft carries a spur pinion 50 which is keyed thereto and which meshes with the spur gear 33 secured to the sleeve 32. Floating on the countershaft 52 is a pulley 55 which may be driven from any suitable source of power not shown. This pulley may be connected to the shaft 52 by means of a clutch 56 which includes two operating fingers 57 adapted to be spread apart to engage the clutch by means of a sliding cone 58 mounted on the end of said shaft. Movement of said cone along said shaft is limited by means of a collar 59 secured to the end of the said countershaft. It will be readily comprehended that when the cone 58 is moved toward the clutch 56, that the said clutch becomes engaged to effect a drive between the pulley 55 and the mandrel 37 and when the said cone is moved in the opposite direction, mandrel 37 is disengaged from the pulley and the drive therebetween terminated.

Mounted on the transverse frame member 14 as best shown in Fig. 5 and attached thereto by means of bolts 61 is a bearing 62 similar to the bearings 28 and 29. In this bearing is rotatably mounted a nut 63. This nut has collars 64 and 65 thereon which engage the ends of the bearing 62 and which limit endwise movement of the said nut. Nut 63 is constructed with threads 66 which receive and engage the thread 67 of a screw 68. Screw 68 is connected by means of a coupling 69 with the splined shaft 38, whereby longitudinal movement is given to the said shaft and mandrel 37 connected thereto upon relative rotational movement between the nut 63 and screw 68. The nut 63 is adapted to be rotated by means of a sheave 71 which is attached to the nut 63 by means of cap screws 72 threaded into the end of said nut.

For driving the sheave 71, a countershaft 70 is employed which is journaled in two bearings 74 and 75 secured to the ends of the cross frame members 14 and 15 by means of bolts 73. The counter shaft 70 has secured to it a sheave 80 which serves to drive the sheave 71 through a pair of V-belts 76, encircling the said sheaves. By means of this construction, the nut 63 may be rotated to procure relative movement between the screw 68 and said nut. Floating on the shaft 70 is a pulley 77 which may be driven from any suitable source of power and, if desired, from the same source as that furnishing power for the pulley 55. The pulley 77 may be connected to the shaft 70 by means of a clutch 78 which includes two operating fingers 79 and a sliding cone 81 for spreading the same apart. It will be noted that the clutches 56 and 78 face in opposite directions, so that the cones 81 and 58 must be moved in opposite directions to either engage or disengage the clutches which they control.

For the purpose of arresting the mandrel 37 to apply the stock thereto and to remove the coiled structure therefrom, a brake 83 is employed, best shown in Figs. 1 and 3. This brake consists of a brake drum 84 and a brake band 85 encircling the same. The brake band 85 has a lug 86 attached to one end thereof which rests upon a bracket 87. This bracket is formed with legs 88 which are supported from the longitudinal frame member 13 by means of two cantilevers 90 and 92 which are bolted to said frame member by means of bolts 93. Bolts 94 extending through the said cantilevers and bracket, hold the same in position. The lug 95 lies below the upper portion 96 of bracket 87. A bolt 97 passes jointly through the upper portion 96 of the bracket 87 and through the lugs 95 and 86 of the brake band. A coil spring 98, encircling said bolt and fitted with a washer 99 at the end of the said bolt, urges the lugs of said brake band together, causing the brake band to clamp upon the drum 84 and restrain rotational movement of the countershaft 52.

The movement of the nut 63 may be terminated by means of a stop mechanism indicated in its entirety by the reference numeral 101 and best shown in Fig. 6. The collar 65 of the nut 63 has formed on it a lug or finger 102 which projects radially outwardly therefrom. This finger is adapted to engage the end 103 of one arm 104 of a lever 105. The lever 105 is pivoted on a pin 106 which passes through an upright 107 secured to the transverse frame member 14 by means of bolts 108. This lever has an arm 109 extending in the opposite direction from the arm 104. When the arm 109 is unobstructed, the lug 102 of nut 63, upon rotation of said nut engages the end 103 of arm 104 and swings this arm downwardly and the arm 109 upwardly and until the finger 102 passes the end 103 of the arm 104. If the arm 109 is arrested, the arm 104 stops movement of the nut 63, holding the same in the position shown in Fig. 6. A stop 111, secured to the bearing 62 by means of cap screws 112, limits the upward movement of the arm 104. The lever 105 is urged to swing in a counter-clockwise direction as viewed in Fig. 6, by means of a tension coil spring 113. This coil spring is secured at one end to said lever and at its other end to the transverse frame member 14.

The operation of the various parts of the invention are controlled by means of a control device indicated in its entirety by the reference number 114. This control device includes a shift rod 115 (Figs. 3 and 4) which is mounted for sliding movement in two guides 116 and 120 attached to the frame members 17 and 18. The shift rod 115 is provided with two lugs 117 and 118 which extend upwardly therefrom and are disposed in the path of travel of the coupling 39. When the mandrel 37 reaches its outermost position, the coupling 39 engages the lug 118 and moves the shift rod 115 toward the right as viewed in Figs. 3 and 4. When the mandrel 37 reaches its other extreme position, the same engages the lug 117 and moves the shift rod toward the left.

The extent of the reverse movement of the mandrel 37 is controlled by means of a stop 181 secured to the frame member 17 by means of a bolt 182. This stop may be slightly adjusted by means of a screw 183 which extends through said stop and engages the bearing 29. The stop 181 carries a shoe 184 which engages the coupling 39 and limits inward movement of the mandrel 37.

Figure 4:
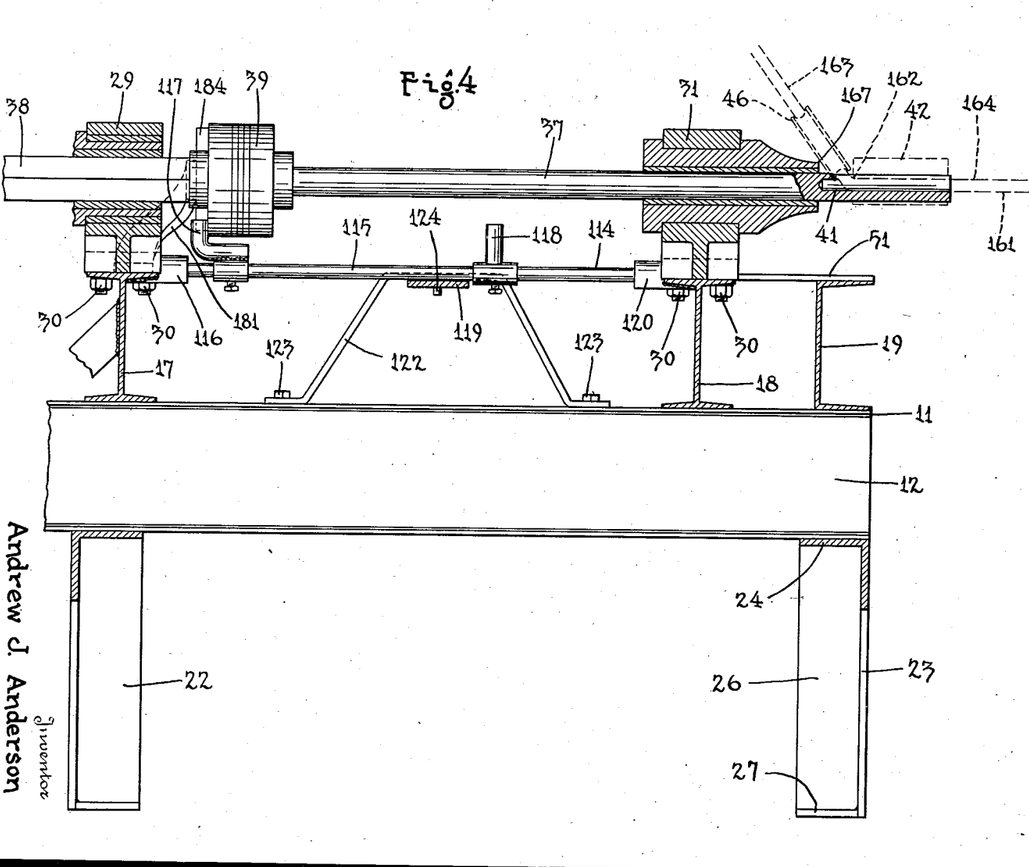
Fig. 4 is a longitudinal elevational sectional view taken on line 4—4 of Fig. 1 and drawn to a greater scale.
Figure 8:
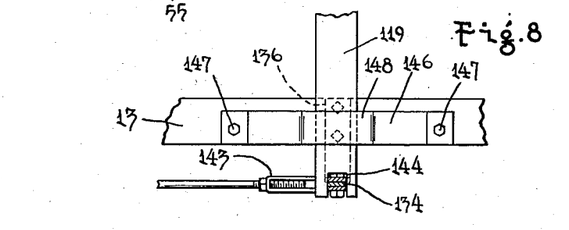
Fig. 8 is a fragmentary plan sectional view taken on line 8—8 of Fig. 3.

Extending beneath the shift rod 115 is a lever 119, best shown in Figs. 1, 4 and 8. This lever is pivoted by means of a bolt 121 to a stand 122 secured to the longitudinal frame member 12 through bolts 123. This lever is also pivoted to the shift rod by means of a pin 124 welded to the rod 114 and extending through said lever. A stand 146, similar to stand 122, is secured to the longitudinal frame member 13 by means of bolts 147. This stand has a horizontal cross-bar 148 at the upper portion of the same best shown in Fig. 3. Immediately below this cross-bar is a second cross-bar 149 which is welded or otherwise secured to the stand 146. The free end of the lever 119 is disposed between the two bars 148 and 149 and is guided for swinging movement thereby.

For operating the clutch 78, a lever 126 is employed illustrated in detail in Fig. 6. This lever has an upwardly extending arm 127 and a downwardly extending arm 128. A bolt 129 extending through the lever 127 and through a bracket 131, serves to support the lever 126 for swinging movement. The bracket 131 is secured to the longitudinally extending frame member 13 by means of bolts or cap screws 132. The arm 127 of lever 126 is provided intermediate the ends thereof with a yoke portion 133 which straddles the cone 81 of clutch 78. This yoke portion of the lever engages the two pins 125 of the operating member of the cone 81 and serves to move said cone longitudinally along the countershaft 70 when the lever 126 is swung about its pivot 129.

A lever 134 similar to the lever 126, is used for operating the cone 58 of clutch 56. This lever is pivoted on a bolt 135 which is secured to a bracket 136 attached to the longitudinal frame member 13 in the same manner as the bracket 131. The lever 134 is formed with an upwardly extending arm 137 and with a downwardly extending arm 138. The lever 134, similar to the lever 126, is formed with a yoke 139 intermediate the ends thereof which engages the pins 141 of the operating member of cone 58. The lowermost arms 128 and 138 of the levers 126 and 134 are connected together by means of a link 142 which is provided with an adjustment 143 at one end of the same for varying the length of the said link. The end of the lever 119 is bifurcated as indicated at 144 in Fig. 8 to receive the arm 138 of lever 134. A connection is thus afforded between the lever 119 and the lever 134, whereby the lever 134 is operated upon movement of the shift rod 115. It will thus be seen that lever 134 is operated by means of the shift rod 115.

The lever 134 may be manually manipulated by means of a handle 158 which is secured to the upper end of the arm 137 of said lever within easy reach of the operator.

For arresting movement of the lever 105, a lug 165 is provided and which is attached to the arm 127 of lever 126. This lug is movable into and out of the path of movement of the lever 105 as the lever 126 is moved.

Operation of the brake 83 is accomplished as follows: Extending downwardly from the cantilever 90 is a bracket 151 to which is pivoted by means of a bolt 152 a bell crank 153. This bell crank has two arms 154 and 155. The arm 154 has pivoted to it a link 156 which, in turn, is pivoted to the lower end of the bolt 97 of brake 83. The other arm 155 of the bell crank 153 has pivoted to it an offset link 157 which, in turn, is pivoted by means of a bolt 158, to a block 159 attached to the link 142. By means of this construction, movement of the link 142 causes movement of the bell crank 153 and corresponding movement of the bolt 97 of the brake 83.

The operation of my improved coiling machine is as follows: In Fig 4, I have shown a portion of a rod 161 upon which it is desired to form an open coil or helix in the nature of a cork screw. To permit of forming the same, the rod is first placed in a punch press and given a bend, as indicated at 162, to form two angularly disposed reaches 163 and 164. The bend 162 is so situated that the screw can be formed on the reach 163. In mounting the rod in the machine, the reach 164 is inserted in the groove 41 in mandrel 37. The bend 162 is of such angle that the reach 163 will lie in the plane of the sheave 46. When the rod has been properly positioned, the sleeve 42 is inserted over the end of the mandrel 37 and the key 45 brought to bear upon the reach 164 of rod 161 to hold the same in position. Lever 134 is now manipulated by means of the handle 158 and caused to swing in a counterclockwise direction, as viewed in Fig. 3. This moves the cone 58 against the fingers 57 of clutch 56 and causes engagement of the clutch. At the same time, link 142 is moved toward the right, as viewed in Fig. 3, which pulls the link 156 downwardly and releases the brake 83. Coincidentally therewith the cone 81 is withdrawn from engagement with the fingers 79 of clutch 78 and the power is disconnected from the countershaft 70 and the nut 63. At such position, the lug 165 is in engagement with the arm 109 of lever 105 and movement of the said lever is arrested. This prevents the stop 102 from movement and holds the nut 63 stationary. Upon engagement of the clutch 56, pulley 55 drives the countershaft 52, which, through the gears 50 and 33, drives the splined shaft 38. This causes rotation of the mandrel 37 and also of the screw 68. Nut 63, being stationary, the threads 66 therein engaging the threads 67 on the screw 68, cause forward longitudinal movement of the shaft 38 and the mandrel 37. Upon rotation of the mandrel 37, the reach 163 of the rod 161 is urged against the sheave 46 and said reach wound upon the mandrel in the form of an open screw or helix 168. Coiling of the reach 163 continues until the coupling 39 engages the lug 118. This causes movement of the shift rod 115 in the direction of travel of the mandrel 37 and causes a counterclockwise movement of the lever 119, as viewed in Fig. 1. Lever 119, through the forked connection with the lever 134, causes clockwise movement of the lever 134 and similar movement of the lever 126. Such movement of the lever 134 disengages the clutch 56. This terminates rotational movement of the countershaft 52 and also of the gear 33 which is splined to the shaft 38. During such movement of the link 142, the bell crank 153 is moved in a clockwise direction, which sets the brake 83 and holds the countershaft 52 and the parts connected therewith from movement. The operator now loosens the sleeve 42 by striking the same with a lead hammer. Movement of the lever 126 in a clockwise direction shifts the lug 165 out of the path of movement of the arm 109 of lever 105 and permits the nut 63 to rotate. Clockwise movement of the lever 125 also engages the clutch 78. The clutch 78, upon being engaged, drives the countershaft 70 and the sheave 80. This, in turn, drives the sheave 71 and the nut 63. Rotation of said nut causes reverse movement of the screw 68 and the mandrel 37. The end of the coil designated by the reference numeral 169 is arranged to engage the end surface 167 of the bearing 31 which surface is so shaped as to cause ejection of the coil from the mandrel 37. As the mandrel reverses, the formed structure is removed and the next rod inserted and keyed to the mandrel by means of the sleeve 42. When the mandrel approaches its extreme position toward the left, as viewed in Fig. 1, the coupling 39 engages the lug 117 on shift rod 115 and moves the shift rod toward the left, as viewed in this figure. This swings the levers 134 and 126 in a manner to disengage clutch 78. Rotation of the nut 63 now ceases. The movement of the cone 58 of clutch 56 is great enough so that the clutch 56 does not become engaged when the clutch 78 is thrown out. Thus, when the reverse movement of the mandrel is completed, the clutch 56, being in neutral and the clutch 78 being moved into neutral, both the screw 68 and the gear 33 will stop. The machine is then in neutral position. Only after the operator moves the handle 158 toward the left, as viewed in Fig. 3, will the machine again be set into operation. It can readily be comprehended that the travel of both the cones 81 and 58 may be regulated, so that termination of the forward movement of the mandrel throws the device into neutral instead of immediately reversing the machine. However, greater speed can be attained in the operation of the machine by making the reverse movement automatic. It can also be comprehended that the movement of these cone members can be adjusted so that the advance movement of the mandrel will also be automatically effected without action on the part of the operator.

The advantages of my invention are manifest. The machine is rapid in action and can be used with considerable economy in time. The machine may be loaded during reverse movement of the mandrel and is adapted to be quickly set into operation upon completion of the cycle of movement of the parts thereof. The machine is fairly simple in construction and operation and is positive and effective in action. The entire construction of the machine is designed to resist abusive use and operate continuously without appreciable attention. With my invention, the mandrel ceases to operate upon return movement thereof, thus permitting the operator to apply the stock and remove the work during the reverse movement of the mandrel.

Changes in the specific form of my invention, as herein described, may be made within the scope of what is claimed, without departing from the spirit of my invention.

Having described my invention, what I claim as new and desire to protect by Letters Patent is:

1. In a coiling machine, revoluble means including a mandrel and a screw revoluble with said mandrel, means for securing the stock to be coiled to the mandrel, driving means for rotating said revoluble means, a revoluble nut cooperating with said screw, locking means for locking said nut from rotation, means for actuating said driving means to procure simultaneous rotation and forward axial movement of said mandrel, means for disconnecting said driving means from said revoluble means, means for unlocking said nut and means for rotating said nut to procure reverse axial movement of said mandrel.

2. In a coiling machine, revoluble means including a mandrel and a screw revoluble and axially movable with said mandrel, means for securing the stock to be coiled to the mandrel, driving means for rotating said revoluble means, a revoluble nut cooperating with said screw, locking means for locking said nut from rotation, driving means for rotating said nut, a brake for restraining rotational movement of said mandrel, a movable control device movable in opposite directions and connected to said two driving means, locking means and brake means, said control device, upon movement in one direction operating said locking means to hold the nut from rotation and connecting said first named driving means to said revoluble means, said control means, upon movement in the opposite direction, disconnecting said first named driving means from the revoluble means, operating said brake and connecting said second driving means to said nut, and means operated upon axial movement of said revoluble means for moving said control device in opposite directions.

3. In a coiling machine, a mandrel, means for securing the stock to be coiled to the mandrel, a splined driving shaft connected to the mandrel, a revoluble driving member splined to the splined shaft and held from axial movement, a screw connected to the splined shaft, a nut rotatable relative to said screw and held from axial movement, means for driving said revoluble driving member, means for driving said nut, a brake for holding said revoluble driving member from rotation and locking means for holding said nut from rotation.

4. In a coiling machine, revoluble means including a mandrel and a screw revoluble with said mandrel, means for securing the stock to be coiled to the mandrel, a source of power, a driving member on said revoluble means, a clutch between said source of power and said driving member, a nut cooperating with said screw, a driving member connected to said nut, a clutch between said source of power and said second driving member, a movable control member movable in opposite directions, means operated by said control member for engaging one clutch and disengaging the other upon movement in one direction and for disengaging the first clutch and engaging the second clutch upon movement in the opposite direction and means operated upon axial movement of said mandrel in opposite directions for operating said control member in opposite directions.

5. In a coiling machine, revoluble means including a mandrel and a screw revoluble with said mandrel, means for securing the stock to be coiled to the mandrel, a source of power, a driving member connected to said revoluble means, a clutch between said source of power and said driving member, a nut cooperating with said screw, a driving member connected to said nut, a clutch between said source of power and said second driving member, a brake for arresting rotational movement of said mandrel, a locking device for arresting rotational movement of said nut and a movable control member movable in opposite directions, said control member, when moved in one direction, engaging the clutch for operating the driving member rotating said revoluble means and rendering effective the locking means for restraining rotational movement of the nut, said control member, when moved in the opposite direction, operating said brake to restrain rotational movement of the revoluble means and engaging said clutch for rotating said nut and means operated upon axial movement of the mandrel for operating said control member.

6. In a coiling machine, revoluble means including a mandrel and a screw revoluble and axially movable with said mandrel, means for securing the stock to be coiled to the mandrel, driving means for rotating said revoluble means, a revoluble nut cooperating with said screw, locking means for locking said nut from rotation, driving means for rotating said nut, a brake for restraining rotational movement of said mandrel, a shift rod, means for guiding said shift rod for movement in a direction parallel to the axis of said mandrel, means forming opposing facing shoulders and carried by said shift rod, means on said revoluble means forming two other shoulders for cooperating with said shoulders on said shift rod, the shoulders of one pair of said shoulders being spaced from one another to procure movement of said shift rod at the ends of the axial movement of said revoluble means and linkage means connected between said shift rod, said two driving means, locking means and brake for procuring alternate forward and reverse movement of said mandrel upon movement of said shift rod in opposite directions.

7. In a coiling machine, revoluble means including a mandrel and a screw revoluble and axially movable with said mandrel, means for securing the stock to be coiled to the mandrel, driving means for rotating said revoluble means, a revoluble nut cooperating with said screw, a lug revoluble with said screw, a lever having an arm engageable with the lug of said screw, said lug upon rotation of the screw, swinging the lever to cause the arm to clear said lug, means for holding said lever from movement to lock said nut from rotation, driving means for rotating said nut and means for controlling the actuation of both of said driving means and the means for holding said lever from movement.

8. In a coiling machine, revoluble means including a mandrel and a screw revoluble and axially movable with said mandrel, means for securing the stock to be coiled to the mandrel, driving means for rotating said revoluble means, a revoluble nut cooperating with said screw, a lug revoluble with said screw, a lever having an arm engageable with the lug of said screw, said lug upon rotation of the screw, swinging the lever to cause the arm to clear said lug, driving means for rotating said nut, a movable member for actuating said driving means and means operable upon movement of said movable member to hold said lever from movement.

9. In a coiling machine, revoluble means including a mandrel and a screw revoluble and axially movable with said mandrel, means for securing the stock to be coiled to the mandrel, driving means for rotating said revoluble means, a revoluble nut cooperating with said screw, a lug revoluble with said screw, a lever having an arm engageable with the lug of said screw, said lug upon rotation of the screw, swinging the lever to cause the arm to clear said lug, a source of power, a clutch operating between said source of power and said driving means for rotating said nut, a movable member for operating said clutch, a lug on said movable member, said lug being moved into the path of movement of said lever upon disengagement of said clutch.

10. In a coiling machine, a mandrel, means for securing the stock to be coiled to the mandrel, power driven means including a revoluble member for imparting to the mandrel both rotational and forward axial movement, brake means for holding said mandrel from rotational movement and power driven means including a revoluble member for imparting to the mandrel solely reverse axial movement to permit of securing the stock to the mandrel during reverse axial movement of the mandrel.

11. In a coiling machine, revoluble means including a mandrel and a screw revoluble and axially movable with said mandrel, means for securing the stock to be coiled to the mandrel, a revoluble nut cooperating with said screw, means for holding said nut from rotation and for rotating said revoluble means and means for holding said revoluble means from rotation and for rotating said nut.

12. In a coiling machine, revoluble means including a rotatable member movable axially for forming a coil, and a screw revoluble with and axially movable with said rotatable member, a revoluble nut cooperating with said screw, means for holding said nut from rotation and for rotating said revoluble means, and means for holding said revoluble means from rotation and for rotating said nut to move said rotatable member axially.

13. In a coiling machine, revoluble means including a rotatable member for forming a coil, driving means for rotating said revoluble member, means including a spline for guiding said rotatable member for axial movement relative to said driving means, a screw revoluble with and axially movable with said rotatable member, a revoluble nut cooperating with said screw, means for restraining said nut from axial movement, means for holding said nut from rotation and for rotating said driving means, and means for holding said driving means from rotation and for rotating said nut upon release of said nut and restraint of said driving means.

14. In a coiling machine, revoluble means including a rotatable member movable axially for forming a coil, and a screw revoluble with and axially movable with said rotatable member, driving means for rotating said revoluble means, a revoluble nut cooperating with said screw, locking means for locking said nut from rotation, means for actuating said driving means to procure simultaneous rotation and forward axial movement of said rotatable member, means for disconnecting said driving means from said revoluble means, means for unlocking said nut and means for rotating said nut to procure reverse axial movement of said mandrel.

15. In a coiling machine, a mandrel having a longitudinal groove in one end thereof for the reception of one reach of a rod having a bend therein, a sleeve applicable over the free end of the mandrel and engaging the reach of the rod received within the groove to hold the same in position, means for rotating and imparting to the mandrel axial movement, and guide means for engagement with the outwardly extending portion of the rod.

16. In a coiling machine, a mandrel having a longitudinal groove in one end thereof for the reception of one reach of a rod having a bend therein, a sleeve applicable over the free end of the mandrel and engaging the reach of the rod received within the groove to hold the same in position, means for rotating and imparting to the mandrel axial movement, and guide means for engagement with the outwardly extending portion of the rod, said sleeve having a longitudinal slot therein of a width greater than the diameter of the rod and less than the diameter of the mandrel.

17. The method of coiling rods which consists in forming a bend in the rod to provide two reaches, in attaching one reach to a mandrel rotatable and axially movable along a bearing and with the bend nearest the bearing and with said reach extending outwardly from the bearing and with its axis parallel to the axis of the mandrel, in guiding the other reach of the rod for movement toward the mandrel along the direction of its extent, in rotating and advancing the free end of the mandrel in a direction away from the bearing and in detaching the first named reach from the mandrel.

18. In a coiling machine, a mandrel, means for securing the stock to be coiled to the mandrel, rotational driving means for imparting to the mandrel rotational movement, means simultaneously operable with the rotational driving means for imparting to the mandrel forward coincidental axial movement, means for terminating operation of said rotational driving means to arrest rotational movement of the mandrel, and rotational driving means for imparting to the mandrel reverse axial movement while the mandrel is held from rotation.

19. The method of coiling rods which consists of forming a bend in the rod to provide two angularly disposed reaches, in arranging one reach adjacent and parallel to a mandrel rotatably and axially movable along a bearing and with the bend nearest the bearing and with said reach extending outwardly from the bearing, in applying to the denoted reach attaching means for securing said reach to the mandrel, in guiding the other reach of the rod for movement toward the mandrel along the direction of its extent, in rotating and advancing the free end of the mandrel in a direction away from the bearing and upon completion of the coil in detaching the first named reach from the mandrel.

ANDREW J. ANDERSON.